May 3, 1966 G. G. SPINNER 3,249,901

DIELECTRIC SUPPORTS FOR HIGH FREQUENCY COAXIAL LINES

Filed Oct. 3, 1963 3 Sheets-Sheet 1

Jnventor:
GEORG GUSTAV SPINNER

By
OSTROLENK, FABER, GERB & SOFFEN
ATTORNEYS

May 3, 1966 G. G. SPINNER 3,249,901
DIELECTRIC SUPPORTS FOR HIGH FREQUENCY COAXIAL LINES
Filed Oct. 3, 1963
3 Sheets-Sheet 2

Jnventor:
GEORG GUSTAV SPINNER
By
OSTROLENK, FABER, GERB & SOFFEN
ATTORNEYS

DIELECTRIC SUPPORTS FOR HIGH FREQUENCY COAXIAL LINES

Filed Oct. 3, 1963 3 Sheets-Sheet 3

Inventor:
GEORG GUSTAV SPINNER
By
OSTROLENK, FABER, GERB & SOFFEN
ATTORNEYS

United States Patent Office 3,249,901
Patented May 3, 1966

3,249,901
DIELECTRIC SUPPORTS FOR HIGH FREQUENCY COAXIAL LINES

Georg G. Spinner, 33 Erzgiessereistr., Munich, Germany

Filed Oct. 3, 1963, Ser. No. 314,588
Claims priority, application Germany, Oct. 12, 1962, S 82,018
16 Claims. (Cl. 333—96)

In rigid coaxial cables or lines that are used to transmit high frequency energy, particularly at frequencies lying in the ultra high frequency band, the inner conductor is customarily held by ring-shaped insulating discs, called dielectric spacers or supporters. Certain mechanical and electrical demands are made of these supports: they must provide a reliable and secure support of the inner conductor and they must offer the smallest possible disturbance to the path of the electromagnetic field for the propagation of electrical energy in the direction of the principal or transverse electromagnetic (TEM) mode within the coaxial line. It is particularly desirable that, within the designated useful bandwidth of the coaxial line, defined by its upper cutoff wavelength $\lambda_c$, the dielectric supports should not give rise to any reflections.

It is well known that, in order to avoid one of these reflections, the condition must be fulfilled that a dielectric support inserted in a coaxial line having a characteristic impedance $Z_0$ must have the same impedance Z over the operating range of the line. Should the impedance of the dielectric support per se not have this given valve Z, a part of the high frequency energy transmitted by the TEM mode through the coaxial line is then reflected, in dependence on the degree of mismatch between the impedance of the line and that of the support.

However, it has also been known that even if the dielectric support per se presents to the TEM mode the characteristic impedance of the line, reflection was still present. To prevent this additional reflection by the dielectric supports various compensating schemes have been employed, depending on the fact that a dielectric support acts as a low pass filter because of its electrically capacitive nature.

It has turned out, however, that these known compensatory measures are inadequate when more stringent demands are placed on the degree to which the line must be free of reflection.

The invention arises from the novel appreciation that a part of this additional reflection arises from electrical reactances within the useful bandwidth of the coaxial line that appear as a consequence of each dielectric support acting as a resonator for the heretofore ignored transverse electric (TE) and transverse magnetic (TM) modes of propagation occurring within the support. The invention makes possible dielectric supports possessing, on the one hand, the desired mechanical strength, and, on the other hand, in consequence of the reduced reflection afforded by reducing the electrical reactances within the useful bandwidth of the coaxial line caused by resonances of the undesired TE and TM mode within the dielectric support, the optimum electrical characteristics. Of these two modes, the TM is the more important cause of reflection. The dielectric supports of the invention shift one or the other or both of these resonances to shorter wavelengths, thereby reducing the corresponding reactances of the support over the useful bandwidth of the line to such a small value that it can, if desired, be exactly compensated for. The reduced reactances exhibited by the dielectric supports of the invention result in supports having a reduced coefficient of reflection over the useful bandwidth of the coaxial line.

An object of the invention is coaxial line dielectric supports that shift the resonant frequency of the TE and/or TM mode within the support to a higher frequency.

Another object of the invention is coaxial line dielectric supports that reduce the electrical reactances, throughout the useful bandwidth of the line, within the support caused by the resonance of the TE and/or TM mode in the support.

A further object of the invention is coaxialine line dielectric supports having a lowered coefficient of reflection throughout the useful bandwidth of the line.

These and further objects of the invention will be apparent from the following.

By way of example and not in limitation thereof, several embodiments of the invention will now be described in detail and with reference to the accompanying drawings, in which.

Figure 3:
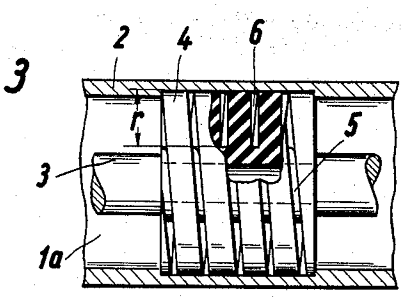
FIGURE 3 is a sectional view with a broken out section, showing one form of an embodiment of the invention, having a spiral groove.
Figure 3B:
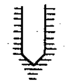
Figure 3A:
Figure 4:
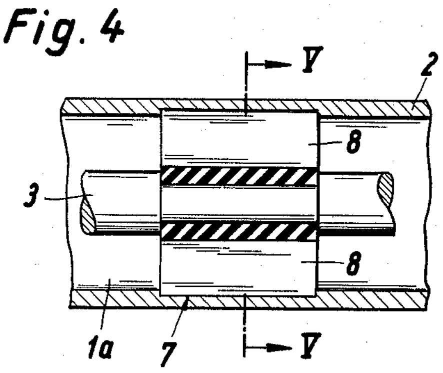
Figure 5:
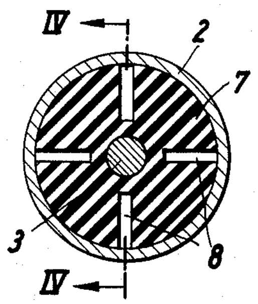
Figures 6, 7, 8, 9, 10, 11, 12, 13:
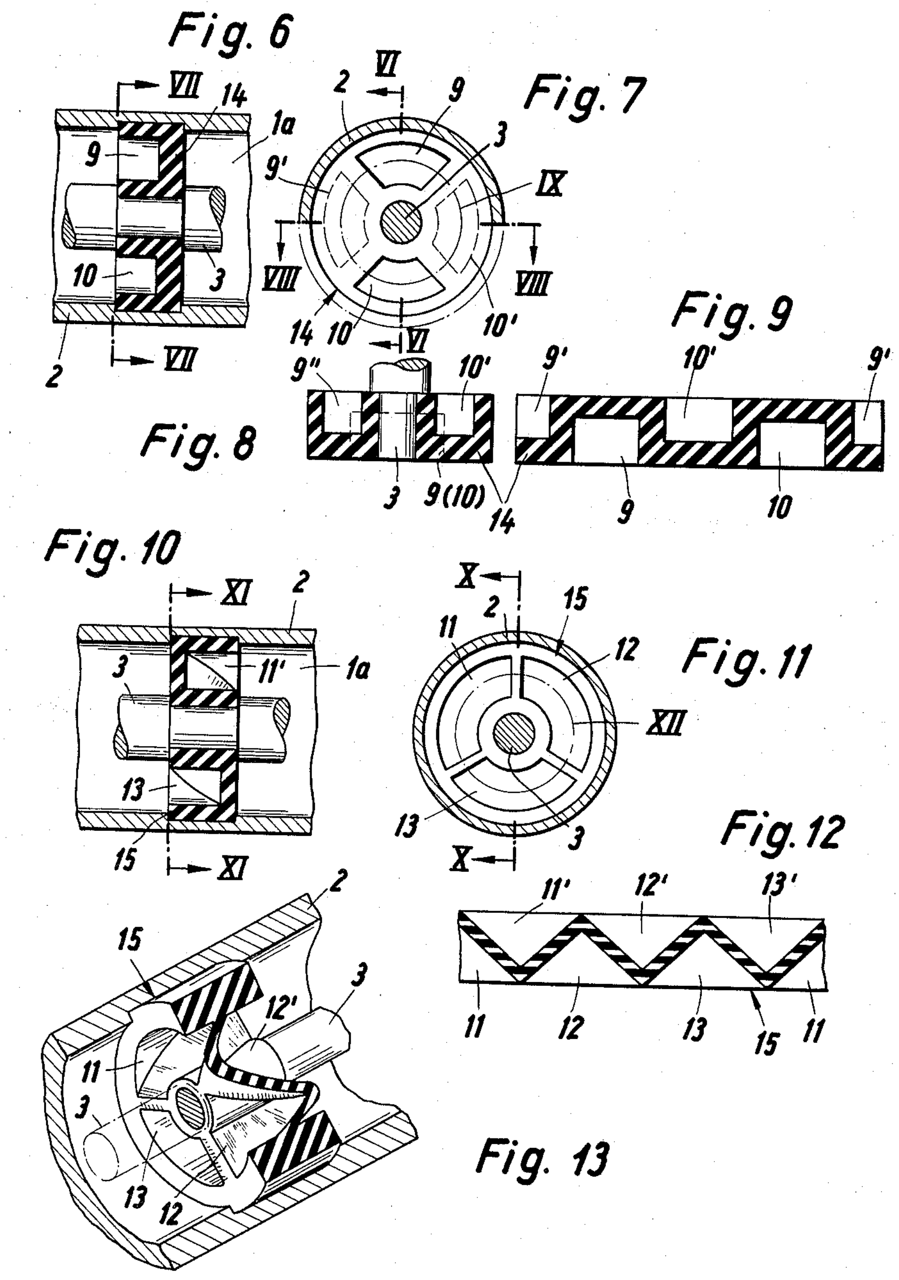
Figure 14:
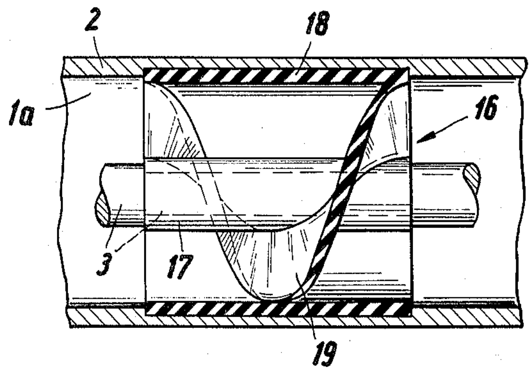
Figure 15:
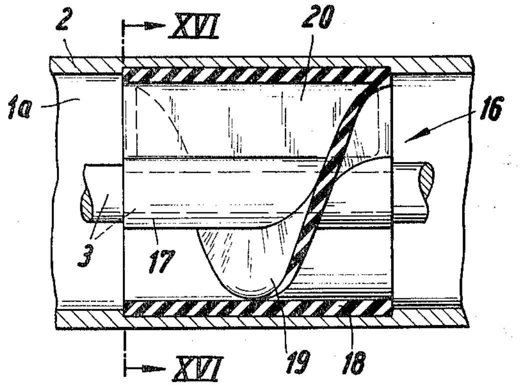
Figure 16:
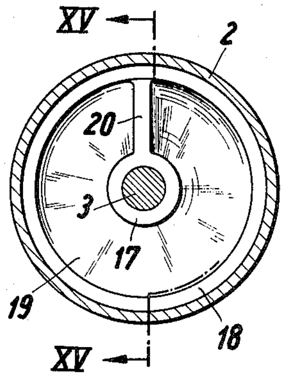

FIGURE 3*a* and 3*b* show other possible shapes, in cross section, of the grooves or slots of the embodiments of FIGURES 3, 4, and 5;

FIGURE 4 is a sectional view taken along line IV—IV of FIGURE 5, showing another form of the said one embodiment of the invention;

FIGURE 5 is a sectional view taken along line V—V of FIGURE 4;

FIGURE 6 is a sectional view taken along line VI—VI of FIGURE 7, showing a form of a further embodiment of the invention;

FIGURES 7 and 8 are sectional views taken along lines VII—VII and VIII—VIII of FIGURES 6 and 7, respectively;

FIGURE 9 is a developed sectional view taken along line IX—IX of FIGURE 7;

FIGURE 10 is a sectional view taken along line X—X of FIGURE 11, showing another form of said further embodiment;

FIGURE 11 is a sectional view taken along line XI—XI of FIGURE 10;

FIGURE 12 is a developed sectional view taken along line XII—XII of FIGURE 11;

FIGURE 13 is a pictorial sectional view of the form of FIGURES 10 to 12;

FIGURES 14 and 15 are broken away side views of two forms of a further embodiment of the invention, FIGURE 15 being taken along line XV—XV of FIGURE 16; and FIGURE 16 is an end view taken along line XVI—XVI of FIGURE 15.

Figure 1:
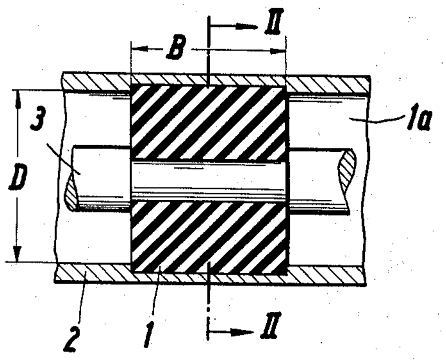
Fig. 1 PRIOR ART
FIGURE 1 is a longitudinal section taken along line I—I of FIGURE 2, and showing a dielectric support of the prior art.
Figure 2:
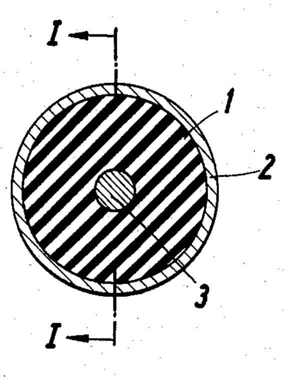
FIGURE 2 is a section taken along line II—II of FIGURE 1.

Referring to FIGURES 1 and 2 of the drawing, there is shown a conventional dielectric support or spacer 1 held in a groove of the outer conductor 2 and supporting the inner conductor 3 of the coaxial line thus formed. The space, indicated by reference numeral 1*a*, between successive dielectric supports, and enclosed by the inner wall of the outer conductor, may contain a gas, as is well known in the art. D is the inner diameter of the outer conductor and B is the axial length of the dielectric support.

Throughout the figures, like reference numerals refer to like elements.

In accordance with one embodiment of the invention the dielectric support is provided with one or more spiral grooves or slots, of which the value of the pitch $h$ is defined as $\infty \geqq h > 0$. Since, as a rough approximation, the reflection decreases as the depth and width of the groove or grooves increase, the groove or grooves will, in general, be as deep and wide as possible, consonant with the necessary mechanical strength and rigidity required of the support for a given application. It is generally preferable that the depth of the groove or grooves should not be less than 75% of the radial depth of the support and can extend to the very surface of the inner conductor within the support. The value for $h$ can be varied in accordance with mechanical considerations and the general principle that a low value for $h$ influences primarily the TM mode, which is the more important influence on the reflection coefficient, and a high value primarily the TE mode. That is to say, the TM or TE mode is chiefly influenced depending on whether the angle between the groove or slot and the axis of the support is more or less than 45°, respectively.

The slots or grooves can be empty—that is, free of solid matter—or filled with a suitable ferrite slug or material. The cross section of the grooves or slots can have any suitable form; and, for example, may take the forms of FIGURES 3*a* and 3*b*, as well as the rectangular configuration of FIGURES 3 and 5. It will be understood that the included angle of the V-shaped groove of FIGURE 3*a* or of the bottom of the groove of FIGURE 3*b* can be varied as desired, in accordance with electrical and mechanical considerations, as well as ease of manufacture.

Referring, now, to the two specific and exemplary forms of this embodiment shown in FIGURES 3 to 5, the form of FIGURE 3 represents that for which $h$ has a finite value greater than zero, and the form of FIGURES 4 and 5 that for which $h$ has an infinite value.

In FIGURE 3, the individual dielectric support 4 is provided with at least one spiral groove 6 having a radial depth that is less than the depth to the inner conductor 3, thereby leaving a central hub part 5 for supporting the inner conductor. Although the shape of the groove in cross section is shown in the broken away section as rectangular, it could also assume the configurations of FIGURES 3*a* or 3*b*, or still other shapes. This form of dielectric support of the invention, in which $h$ has a finite value greater than zero and the angle defined between the axis of the support and the groove is not less than 45°, is particularly effective in shifting the resonance of the TM mode within the support to shorter wavelengths, and thereby very substantially reducing, as a consequence of the lower reactances, the amount of reflection, as caused by the support, throughout the entire useful bandwidth of the coaxial line.

In the form of FIGURES 4 and 5 the radial grooves or slots 8, of the dielectric support 7, are longitudinal, as $h$ assumes its limiting value of $\infty$. Although four radial grooves are shown, any number of grooves, from one up, may be used, as found desirable. Once again, the shape in cross section of the grooves can be varied to conform to the shapes of FIGURES 3*a* or 3*b*, or other configurations. This form of the embodiment, of which—considering this form in its most general aspect—the angle defined between the groove and the axis of the support is not greater than 45°, is particularly influential in raising the resonant frequency of the TE mode within the dielectric support, reducing the resulting reactances within the useful bandwidth of the coaxial line and, consequently, the reflection arising therefrom. The number of grooves in this form of the embodiment does not substantially further influence the degree to which the reflection is reduced; rather, each additional groove chiefly shifts the resonance of the TE mode to shorter and shorter wavelengths.

As already remarked, it is perfectly possible for the grooves or slots of either form of the embodiment to extend to the very surface of the inner conductor within the support. In such a case, where there is more than one groove, it may be necessary to employ some suitable auxiliary means for holding the two or more resulting sections of the support in their proper relationship. Such means could include means associated with the outer and/or inner conductor of the coaxial line, for determining the position of the associated section of the support with regard to the conductors. Or each groove could be "indented" along its entire radial length at its one or other or both ends, or otherwise preferably next to the inner conductor, so as to leave a connection of suitable strength between what otherwise would be separated sections of the support.

An embodiment of the invention now to be described, illustrated by the two forms of FIGURES 6 to 9 and 10 to 13, respectively, is particularly advantageous because it combines the virtues of the two forms of the previous embodiment. The resonances of both the TE and TM modes within the dielectric support are shifted to shorter wavelengths, reducing the resulting reactances within the useful bandwidth of the coaxial line and the consequent reflection. This embodiment, which is also advantageous because it is unusually rigid mechanically and permits operating the coaxial line under a positive or negative gas pressure, has a series of open cavities facing in successively opposite directions along the axis of the support. The wall so formed, in those portions normal to the direction of propagation of the TEM mode, forms an air-dielectric interface of reduced thickness, whereby, as an additional advantage of this embodiment, the reflection arising therefrom is also reduced.

In the form of FIGURES 6 to 9, the dielectric support 14 has a series of four open cavities, two—9 and 10—facing in one direction, and two—9' and 10'—facing in the opposite direction, along the axis of the support. The developed section of FIGURE 9 taken along line IX of FIGURE 7 shows the wall formed by the alternately oppositely facing cavities in the body of the support as having alternate radial wall sections at the respective opposite axial extremes of the support member 14 joined by axial wall sections.

FIGURES 10 to 13 show another possible form of this embodiment of the invention. In this form there are, altogether, six cavities—11, 12, 13 and 11', 12', and 13'—facing alternately in opposite directions along the axis of the support 15. The "unrolled" or developed section of FIGURE 12 shows clearly the zigzag of the wall thus formed. FIGURE 13 is a pictorial view of this form of the invention, showing clearly the construction of the dielectric support. This form of the invention has a particularly low coefficient of reflection throughout the useful bandwidth of the coaxial line.

Other forms of this embodiment of the invention, employing a different number of cavities and/or cavities of a different shape, are, of course, also possible. It is not necessary that all cavities be of the same size, but simply that, in such a case, for a cavity of one size there must always be a second cavity of the same size symmetrically disposed to the first in regard of the axis of the dielectric support.

It will also be appreciated that in the embodiment of FIGURES 6 to 13 it is possible to eliminate that wall of the support, FIGURES 6–9, or hub part, FIGURES 10–13, that surrounds and supports the inner conductor. In this event the radial wall in FIGURES 6 to 9 or the zigzag wall in FIGURES 10 to 13 is extended to contact, and thereby form a central aperture for supporting, the inner conductor. Alternatively, the wall of FIGURES 6 to 13, the outer surface of which contacts the outer conductor, can be eliminated, whereby the outer surface of the vertical wall is in direct contact with the outer conductor. It is also possible, depending on the mechanical strength required, to remove both the inner and outer walls, the inner and outer edge surfaces of the vertical wall of the support being in direct contact with the surfaces of the inner and conductors, respectively.

With reference to FIGURE 14, another embodiment of the invention, reducing the reactances caused by the TE and TM modes resonating, consists of a dielectric support 16 having, in one example, a central apertured hub 17 for supporting the inner conductor; an outer wall 18, of which the outer surface contacts the inner surface of the outer conductor; and a radial helical wall 19, supported throughout its length by the hub and the outer wall. The convolution of the helix extends between the opposed diametrical extremes of the inner wall of outer conductor 2 and spirals about the hub 17 to form at least one complete turn.

It is also possible to eliminate the hub and to have the helical wall spiral about the surface of the inner conductor in direct contact therewith. Alternatively, the hub can be retained and the outer wall 18 removed, in which case the outer edge surface of the spiral wall will directly contact the outer conductor. As a final alternative, both the hub 17 and outer wall 18 can be eliminated, provided that sufficient mechanical strength remains for the given application, whereby the spiral wall 19 is in direct contact with both conductors along its entire length.

To form a gas tight dielectric support, either form of the embodiment can be provided with a planar wall 20, as shown in FIGURE 15, that joins at its one end the start of the helical wall and at its other end the finish of the helical wall.

FIGURE 16 is an end view of the support of FIGURE 15.

Since, in general, the thinner the wall 19 (or the walls 19 and 20) the better the electrical performance of the support, the thickness of the wall will be determined by mechanical considerations. It is also possible to provide two spiral walls, spaced 180°, or three or more such walls equiangularly spaced from one another about the central axis of the dielectric support.

All embodiments of the invention preferably present, as do those described above, a constant impedance, equal to the characteristic impedance of the coaxial line, to the TEM mode throughout the length of the dielectric support. It will be understood that this preferred condition is not, however, an inherent limitation on the invention, but only a desirable practical requirement in the nature of things.

The supports of the invention have better electrical characteristics when the following conditions (which, however, are not essential to the invention) are observed (see FIGURE 1):

$$3<q<4, \text{ where } q=\frac{D}{B}; \text{ and}$$

$$\epsilon_r<3, \text{ where } \epsilon_r \text{ is the dielectric constant}$$

When $q<3$, the resonance of the TE mode may appear within the useful bandwidth of the coaxial line. When $q>4$, the reactances from the grooves in the inner and outer conductors for holding the support may become sufficiently large to cause an objectionable amount of reflection.

While there have been described several embodiments of the invention, it will be obvious to those skilled in the art that modifications can be made therein without adparture therefrom; and the appended claims are intended to cover all such modifications as fall within the true scope and spirit of the invention.

What I claim is:

1. An internal dielectric support for coaxial lines, said support defining a central axis, a central aperture concentric with said axis for holding the inner conductor of the line, an outer surface for contacting the inner wall of the outer conductor of the line, and first and second ends for determining the axial length of said support; and having means, forming an integral part of said support, for shifting the resonance of at least one of the two undesired modes of propagation occurring within the support, the TE and TM modes, to a shorter wavelength, thereby reducing the associated electrical reactances over the useful bandwidth of the line and consequently reducing, over the same bandwidth, the reflection caused by the support in consequence of the said associated reactances, said means is at least one spiral groove, of which the pitch $h$ is defined as $\infty \geqslant h > 0$, said at least one groove extending at least along substantially the entire axial length of the support, opening onto said outer wall, and having a depth $r$ defined as $r \leqslant l$, where $l$ is the distance from said outer surface to said central aperture, as measured along a line intersecting said central axis and perpendicular thereto.

2. An internal dielectric support for coaxial lines, said support defining a central axis, a central aperture concentric with said axis for holding the inner conductor of the line, an outer surface for contacting the inner wall of the outer conductor of the line, and first and second ends for determining the axial length of said support; and having means, forming an integral part of said support, for shifting the resonance of at least one of the two undesired modes of propagation occurring within the support, the TE and TM modes, to a shorter wavelength, thereby reducing the associated electrical reactances over the useful bandwidth of the line and consequently reducing, over the same bandwidth, the reflection caused by the support in consequence of the said associated reactances, said means constructed to reduce the reactances caused at least by the resonance of the said TM mode within the support, said means is at least one spiral groove, of which the pitch $h$ is defined as $\infty > h > 0$, said at least along substantially the entire axial length of the support, opening onto said outer wall, and having a depth $r$ defined as $r \leqslant l$, where $l$ is the distance from said outer surface to said central aperture, as measured along a line intersecting said central axis and perpendicular thereto.

3. An internal dielectric support for coaxial lines, said support defining a central axis, a central aperture concentric with said axis for holding the inner conductor of the line, an outer surface for contacting the inner wall of the outer conductor of the line, the first and second ends for determining the axial length of said support; and having means, forming an integral part of said support, for shifting the resonance of at least one of the two undesired modes of propagation occurring within the support, the TE and TM modes, to a shorter wavelength, thereby reducing the associated electrical reactances over the useful bandwidth of the line and consequently reducing, over the same bandwidth, the reflection caused by the support in consequence of the said associated reactances, said means constructed to reduce the reactances caused at least by the resonance of the said TE mode within the support, said means is at least one spiral groove, of which the pitch $h$ is defined $\infty \geqslant h$, said at least one spiral groove extending along at least substantially the entire axial length of the support, opening onto said outer wall, and having a depth $r$ defined as $r \leqslant l$, where $l$ is the distance from said outer surface to said central aperture, as measured along a line intersecting said central axis and perpendicular thereto.

4. The dielectric support of claim 1, wherein said at least one spiral groove is filled with a ferrite material.

5. An internal dielectric support for coaxial lines, said support defining a central axis, a central aperture concentric with said axis for holding the inner conductor of the line, an outer surface for contacting the inner wall of the outer conductor of the line, and first and second ends for determining the axial length of said support; and having means, forming an integral part of said support, for shifting the resonance of at least one of the two undesired modes of propagation occurring within the support, the TE and TM modes, to a shorter wavelength, thereby reducing the associated electrical reactances over the useful bandwidth of the line and consequently reducing, over the same bandwidth, the reflection caused by the support in consequence of the said associated reactances, said means constructed to reduce the reactances caused by the resonances of both the TM and TE modes within the support, said means comprises a solid wall located between said inner and outer conductors and forming a plurality of angularly adjacent cavities circumferentially arranged about said central aperture, all of said cavities within an annular volume defined by fixed radial extremes, said cavities opening alternately in the one direction and in the opposite direction along said central axis, there being as many cavities opening in the one direction as in the opposite, the depth $e$ of said wall, as measured along a line intersecting said central axis and perpendicular thereto, being defined as $e \leqslant s$, where $s$ is the distance from the inner surface of said outer conductor to the surface of the inner conductor within the support.

6. The dielectric support of claim 5, wherein the developed section of said solid wall includes alternate radial wall sections at the axial extremes of the dielectric support, joined by axial wall sections.

7. The dielectric support of claim 5, wherein the developed section of said solid wall is a zigzag.

8. An internal dielectric support for coaxial lines, said support being rigid and defining a central axis, a central aperture concentric with said axis for holding the inner conductor of the line, an outer surface for contacting the inner wall of the outer conductor of the line, and first and second ends for determining the axial length of said support, said axial length being substantially less than the length of the coaxial line in which said support is used; and having means, forming an integral part of said support, for shifting the resonance of at least one of the two undesired modes of propagation occurring within the support, the TE and TM modes, to a shorter wavelength, thereby reducing the associated electrical reactances over the useful bandwidth of the line and consequently reducing, over the same bandwidth, the reflection caused by the support in consequence of the said associated reactances, said means constructed to reduce the reactances caused by the resonances of both the TM and TE modes within the support, said means comprises a helical wall, convoluting between opposed diametrical extremes of said outer conductor, and spiralling about said inner conductor between said first and second ends of said dielectric support to form at least one complete turn, said wall having radial depth $d$ defined as $d \leqslant s$, where $s$ is the distance from the inner surface of said outer conductor to the surface of the inner conductor within the support.

9. The dielectric support of claim 3, there being at least two spiral grooves, whereby each additional groove removes the resonance of the TE mode within the support to a shorter wavelength.

10. The dielectric support of claim 2, wherein said at least one groove and said central axis define an angle of not less than 45°.

11. The dielectric support of claim 3, wherein said at least one groove and said central axis define an angle of not more than 45°.

12. The dielectric support of claim 5, wherein at least one of the said two conductors of the line is in direct contact with said solid wall.

13. The dielectric support of claim 5, wherein at least one of the said two conductors of the line is in contact with a wall joining said solid wall.

14. The dielectric support of claim 8, wherein at least one of the said two conductors of the line is in direct contact with said helical wall.

15. The dielectric support of claim 8, wherein at least one of the said two conductors of the line is in contact with a wall joining said helical wall.

16. The dielectric support of claim 8, including a radial wall extending longitudinally along said central axis and intersecting said helical wall at its two ends.

References Cited by the Examiner

UNITED STATES PATENTS

| | | | |
|---|---|---|---|
| 1,912,794 | 6/1933 | Peterson | 333—96 |
| 1,940,780 | 12/1933 | Wilson | 174—111 |
| 2,204,737 | 6/1940 | Swallow et al. | 174—29 |
| 2,276,084 | 3/1942 | New | 333—96 X |
| 2,706,275 | 4/1955 | Clark | 333—34 |
| 2,774,944 | 12/1956 | Lintzel | 333—96 |
| 3,188,587 | 6/1965 | Huber et al. | 333—96 |

FOREIGN PATENTS

| | | |
|---|---|---|
| 48,593 | 1/1938 | France. |
| 1,944 | 1/1906 | Great Britain. |

HERMAN KARL SAALBACH, *Primary Examiner.*

R. F. HUNT, Jr., *Assistant Examiner.*